(12) United States Patent
Aggarwal et al.

(10) Patent No.: US 8,085,791 B1
(45) Date of Patent: Dec. 27, 2011

(54) USING LAYER TWO CONTROL PROTOCOL (L2CP) FOR DATA PLANE MPLS WITHIN AN L2 NETWORK ACCESS NODE

(75) Inventors: Rahul Aggarwal, San Francisco, CA (US); Benjamin Hickey, Bronte (AU); Sanjay Wadhwa, Acton, MA (US); Jerome P. Moisand, Arlington, MA (US)

(73) Assignee: Juniper Networks, Inc., Sunnyvale, CA (US)

( * ) Notice: Subject to any disclaimer, the term of this patent is extended or adjusted under 35 U.S.C. 154(b) by 578 days.

(21) Appl. No.: 11/621,409

(22) Filed: Jan. 9, 2007

Related U.S. Application Data

(60) Provisional application No. 60/843,202, filed on Sep. 8, 2006.

(51) Int. Cl.
  *H04L 12/56* (2006.01)
(52) U.S. Cl. .................. 370/400; 370/392; 370/401
(58) Field of Classification Search .................. None
See application file for complete search history.

(56) References Cited

U.S. PATENT DOCUMENTS

| | | | |
|---|---|---|---|
| 6,522,627 B1 * | 2/2003 | Mauger ................. | 370/230 |
| 6,778,494 B1 * | 8/2004 | Mauger ................. | 370/230 |
| 6,826,196 B1 | 11/2004 | Lawrence | |
| 6,996,110 B1 * | 2/2006 | Amara et al. ............ | 370/396 |
| 7,613,188 B1 | 11/2009 | French et al. | |
| 2003/0126289 A1 | 7/2003 | Aggarwal et al. | |
| 2004/0068571 A1 * | 4/2004 | Ahmavaara .............. | 709/228 |
| 2004/0133700 A1 * | 7/2004 | De Clercq et al. ........ | 709/242 |
| 2004/0258003 A1 | 12/2004 | Kokot et al. | |
| 2006/0187950 A1 | 8/2006 | Bou-Diab et al. | |
| 2007/0286090 A1 * | 12/2007 | Rusmisel et al. ......... | 370/252 |
| 2007/0286204 A1 * | 12/2007 | Ould-Brahim ........... | 370/395.5 |
| 2009/0010182 A1 * | 1/2009 | Tochio .................... | 370/254 |
| 2009/0168783 A1 * | 7/2009 | Mohan et al. ........... | 370/395.5 |

FOREIGN PATENT DOCUMENTS

| | | |
|---|---|---|
| EP | 1 134 932 A1 | 9/2001 |
| EP | 1 296 487 A2 | 3/2003 |
| EP | 1 318 628 A1 | 6/2003 |
| EP | 1 453 260 A1 | 9/2004 |

(Continued)

OTHER PUBLICATIONS

S. Ooghe, Framework and Requirements for an Access Node Control Mechanism in Broadband Multi-Service Networks, May 2006, Network Working Group Internet-Draft, pp. 1-27.*

(Continued)

*Primary Examiner* — Anthony Sol
(74) *Attorney, Agent, or Firm* — Shumaker & Sieffert, P.A.

(57) ABSTRACT

The invention is directed towards techniques for forwarding subscriber frames through a Multi-Protocol Label Switching (MPLS) aggregation network using MPLS labels. Layer two (L2) network devices, such as access nodes, of a service provider (SP) network implement MPLS functionality in the data plane, but do not implement an MPLS signaling protocol in the control plane. The L2 network devices include a pool of labels applied in the data plane of the L2 network device to output MPLS communications to the MPLS network, and a protocol that allows a layer three (L3) device to control provision of L2 functionality by the L2 device. The pool of labels is dynamically configured by the L3 device via the protocol. The access nodes distribute the subscriber labels and MPLS labels as upstream assigned labels.

23 Claims, 9 Drawing Sheets

FOREIGN PATENT DOCUMENTS

| WO | WO 99 66736 A2 | 12/1999 |
|----|----------------|---------|
| WO | WO 02 14979 A2 | 2/2002  |

OTHER PUBLICATIONS

European Search Report for International Application No. PCT/EP2004/051184, Apr. 21, 2005, 2 pgs.

Wu et al., "Cisco Systems Router-port Group Management Protocol (RGMP)," Internet Draft, RFC 3488, Feb. 2003, pp. 1-17, XP002299262: p. 4, line 17-p. 6, last line.

Fenner, W., "Internet Group Management Protocol, Version 2," Internet Draft, RFC 2236, Nov. 30, 1997, XP002230720, p. 4, line 1-p. 6, line 8.

Jun Wang et al. "IGMP Snooping: A VLAN-based multicast protocol," 5th IEEE International Conference on High Speed Networks and Multimedia communication, Jul. 3, 2002, pp. 335-340, XP010603050, p. 336, right-hand column, line 1-p. 337, left-hand column, line 25.

"L2TP Multicast Extension" http://www.ietf.org/internet-drafts/draft-ietf-l2tpext-mcast-03.txt Mar. 2003.

U.S. Appl. No. 10/601,131, entitled "Controlling Data Link Layer Elements with Network Layer Elements," filed Jun. 20, 2003, Kurt Melden et al.

U.S. Appl. No. 11/621,386, entitled "Layer Two (L2) Network Access Node Having Data Plane MPLS," filed Jan. 9, 2007, Jerome P. Moisand et al.

Office Action for U.S. Appl. No. 11/621,386, dated Dec. 1, 2009, 16 pp.

Response to Office Action dated Dec. 1, 2009, in U.S. Appl. No. 11/621,386, filed Mar. 1, 2010, 15 pp.

Aggarwal et al., "MPLS Upstream Label Assignment and Context Specific Label Space," Network Working Group Internet-Draft, Oct. 2005, 9 pp.

Wadhwa et al., "GSMP extensions for layer2 control (L2C) Topology Discovery and Line Configuration," Network Working Group Internet-Draft, Jan. 2006, 37 pp.

Response to Office Action dated Apr. 20, 2010, for U.S. Appl. No. 11/621,386, filed Jul. 20, 2010, 18 pp.

Office Action from U.S. Appl. No. 11/621,386, dated Oct. 14, 2010, 23 pp.

\* cited by examiner

USING LAYER TWO CONTROL PROTOCOL (L2CP) FOR DATA PLANE MPLS WITHIN AN L2 NETWORK ACCESS NODE

This application claims the benefit of U.S. Provisional Application Ser. No. 60/843,202, filed Sep. 8, 2006, the entire content of which is incorporated herein by reference.

TECHNICAL FIELD

The invention relates to computer networks and, more particularly, to engineering traffic flows within computer networks.

BACKGROUND

Routing devices within a network, often referred to as routers, maintain routing information that describes available routes through the network. Upon receiving an incoming packet, the router examines information within the packet and forwards the packet in accordance with the routing information. In order to maintain an accurate representation of the network, routers exchange routing information in accordance with one or more defined routing protocol, such as the Border Gateway Protocol (BGP).

The term "link" is often used to refer to the connection between two devices on a network. The link may be a physical medium, such as a copper wire, a coaxial cable, any of a host of different fiber optic lines or a wireless connection. In addition, network devices may define "virtual" or "logical" links, and map the virtual links to the physical links. As networks grow in size and complexity, the traffic on any given link, including peering links, may approach a maximum bandwidth capacity for the link, thereby leading to congestion and loss.

Multi-Protocol Label Switching (MPLS) is a mechanism used to engineer traffic patterns within Internet Protocol (IP) networks. MPLS may be viewed as a protocol that allows packet-based networks to emulate certain properties of a circuit-switched network. By utilizing MPLS, a source device can request a path through a network to a destination device, i.e., a Label Switched Path (LSP). An LSP defines a distinct path through the network to carry MPLS packets from the source device to a destination device. Each router along an LSP allocates a label and propagates the label to the closest upstream router along the path for use in forwarding MPLS packets along the path. Routers along the path cooperatively perform MPLS operations to forward the MPLS packets along the established path.

MPLS operates at an OSI Model layer that is generally considered to lie between traditional definitions of Layer 2 (i.e., the data link layer) and Layer 3 (i.e., the network layer), and thus is often referred to as a "Layer 2.5" protocol. For example, MPLS requires use of Layer 3 routing information and other Layer 3 services with respect to traffic engineering, path selection and construction, but may also utilize Layer 2 services.

SUMMARY

In general, the invention is directed towards techniques for forwarding data from a layer two (L2) access node into a Multi-Protocol Label Switching (MPLS) aggregation network using MPLS labels. For example the techniques may be readily used for forwarding subscriber frames from L2 network access nodes into an MPLS aggregation network provided by a service provider using MPLS labels. Moreover, as described herein, the L2 access nodes (i.e., access devices that operate within the second layer of the OSI network stack) may implement a "light" or "thin" version of MPLS by implementing certain MPLS functions in a forwarding plane (i.e., data plane) of the nodes without fully implementing the L3 portions of the MPLS protocol within a control plane of the nodes. In this manner, the L2 access nodes, which typically are not configured to support network protocols that operate above the second layer of the network stack, may operate to inject MPLS traffic into an MPLS network without being reconfigured to fully implement the MPLS protocol.

For example, access nodes of a service provider (SP) network may be configured to implement MPLS functionality in the data plane, i.e., the hardware and software components handling data forwarding. However, the access nodes need not implement an MPLS signaling protocol in the control plane, i.e., the hardware and software components that provide an operating environment for execution of routing and other protocols for communication with peer devices.

In certain embodiments, the access nodes forward subscriber frames from subscribers to an access provider edge device ("A-PE") using MPLS labels instead of Virtual Local Area Network (VLAN) tags to indicate the forwarding path through the MPLS aggregation network. VLANs are used where the access node interface is an Ethernet interface. As a result, VLANs need not be configured in the access network. This may avoid issues associated with current service provider networks that use MPLS in the service provider domain, but are forced to configure VLANs in the access network to distinguish between services or customers. In other words, the techniques for use of certain MPLS services within the data plane of the L2 access devices may allow SP networks to avoid the overhead and resources necessary to manage both Ethernet VLAN and MPLS forwarding for broadband customers.

In certain embodiments, subscriber labels that distinguish the subscriber access lines and MPLS labels that indicate the forwarding paths through the MPLS network are distributed by access nodes as "upstream assigned" labels. That is, the labels are assigned as close to the subscribers as possible, in particular, at an L2 access node device. For example, in one embodiment the access nodes provide an interface by which an administrator or software agent may define and maintain pools of subscriber labels and MPLS labels for use in the forwarding plane. In this embodiment, the access nodes may autonomously allocate the subscriber labels to subscriber devices that request broadband services from a Broadband Services Router (BSR) or other device within the SP network. In another embodiment, the BSR or other device within the SP network may configure and control allocation of the subscriber labels and MPLS labels on the access nodes via a protocol by which a layer three (L3) device controls provision of layer two (L2) functionality by an L2 device, such as the Layer Two Control Protocol (L2CP), also known as the Access Node Control Protocol (ANCP). In either case, the access nodes need not fully implement the MPLS protocol within the control place of the access nodes.

In one embodiment, a method comprises receiving configuration information on a layer two (L2) network device via an L2 control protocol that allows a layer three (L3) network device to control provision of L2 functionality by the L2 network device, wherein the configuration information specifies a set of Multi-Protocol Label Switching protocol (MPLS) labels. The method also includes applying the MPLS labels in a data plane of the L2 network device to encapsulate L2 data within MPLS packets and output the MPLS packets from the L2 device to an MPLS network.

In another embodiment, a layer two (L2) network device comprises a set of Multi-Protocol Label Switching protocol (MPLS) labels applied by the L2 network device in the data plane of the L2 network device to output MPLS packets to an MPLS network, and an L2 control protocol that allows a layer three (L3) device to control provision of L2 functionality by the L2 network device, wherein set of MPLS labels is dynamically configured by the L3 device via the L2 control protocol.

In a further embodiment, a system comprises a plurality of subscriber devices that request network services and an access node network device that receives the requests for network services from the plurality of subscriber devices, and forwards the requests as MPLS packets to a Multi-Protocol Label Switching (MPLS) network. The system also includes a broadband services router that receives the requests via the MPLS network, and configures the access node network device to include a set of MPLS labels via a layer two (L2) control protocol that allows the broadband services router to control provision of L2 functionality by the access node network device. The access node applies the MPLS labels in the data plane to output the MPLS packets to the MPLS network.

In yet another embodiment, a computer-readable medium comprising instructions for causing a programmable processor to receive configuration information on a layer two (L2) network device via an L2 control protocol that allows a layer three (L3) network device to control provision of L2 functionality by the L2 network device, wherein the configuration information specifies a set of Multi-Protocol Label Switching protocol (MPLS) labels, and apply the MPLS labels in a data plane of the L2 network device to encapsulate L2 data within MPLS packets and output the MPLS packets from the L2 device to an MPLS network.

The techniques of the invention may provide one or more advantages. For example, by running MPLS in only the data plane of the access nodes, a service provider network may employ MPLS-only forwarding in the SP domain. This may simplify the SP network, since only MPLS labels need be managed for connectivity between devices within the SP network. Where the BSR connects directly to the MPLS network with an interface running MPLS, using MPLS-only forwarding may also simplify BSR subscriber interfaces, since VLANS need no longer be used for differentiating between different subscribers on an access node.

The techniques may also allow extension of failover schemes to the access node. For example, fault detection on the access node can allow a global switchover to a backup interface or path. The same encapsulation can be used on the backup interface, and the same pseudowire from the backup A-PE may be used with L2VPN dual-homing. As another example, the invention utilizes the extensibility of MPLS labels, due to increased number space and local significance. Moreover, SP-level operations and management (OAM) may be based solely on MPLS OAM.

The techniques may allow for a clear demarcation between subscriber L2 domain and the SP domain, since subscriber frames can be encapsulated in MPLS packets by the access node. By use of the techniques, there is no requirement to learn the source MAC address of subscriber originated Ethernet frames for purposes of populating a forwarding table in any device, thereby potentially reducing risks associated with Ethernet-based attacks on the SP network. Further, the use of MPLS in only the data plane may result in a simpler access node and may reduce port costs relative to access nodes configured to fully support MPLS. The techniques may also reduce operating expenses, by not having to manage an MPLS network with an order of magnitude more devices, relative to an MPLS network in which access nodes are configured to fully support MPLS. The techniques may provide flexibility to deploy new access technologies without imposing a highly complex set of requirements on the new access nodes.

The details of one or more embodiments of the invention are set forth in the accompanying drawings and the description below. Other features, objects, and advantages of the invention will be apparent from the description and drawings, and from the claims.

DETAILED DESCRIPTION

Figure 1:
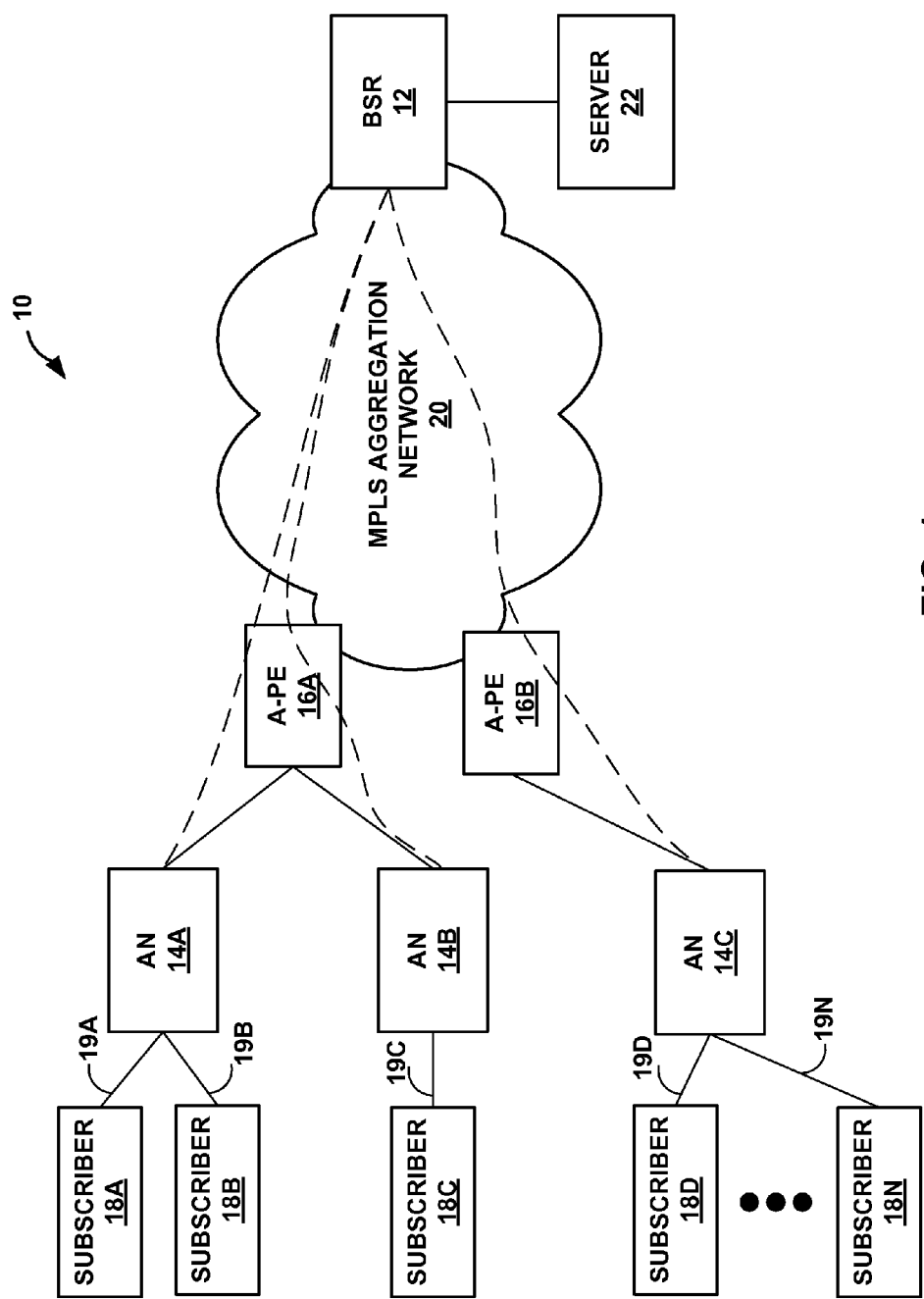
FIG. 1 is a block diagram illustrating an example broadband networking environment in which multi-protocol label switching (MPLS) forwarding is used in a service provider (SP) domain for connectivity between a broadband services router (BSR) and an access node (AN).

FIG. 1 is a block diagram illustrating an example broadband networking environment 10 in which multi-protocol label switching (MPLS) forwarding may be used in a service provider (SP) domain for connectivity between a broadband services router (BSR) 12 and access nodes 14A-14C (collectively, ANs 14). BSR 12 is a layer three (L3) network device that provides broadband network services to subscriber devices 18A-18N (collectively, subscriber devices 18). For example, BSR 12 may be a router, a Broadband Remote Access Server (B-RAS), or a Broadband Network Gateway (BNG). ANs 14 are layer two (L2) network devices, such as switches or access multiplexers, e.g., Digital Subscriber Line Access Multiplexers (DSLAMs) or Cable Modem Termination Systems (CMTSs). As another example, ANs 14 may be access nodes for mobile-based networks or 3G cellular networks. As shown in FIG. 1, ANs 14 and Access-Provider Edge (A-PE) devices 16A-16B (collectively, A-PEs 16) couple subscriber devices 18 to MPLS aggregation network 20. Subscriber devices 18 may be, for example, personal computers, servers, laptop computers, handheld computers, personal digital assistants (PDAs), cellular telephones, wireless communication devices, or network-enabled appliances, such as digital television set-top boxes.

For exemplary purposes, network 20 is described in reference to an MPLS aggregation network. MPLS aggregation network 20 may be an autonomous system associated with a Service Provider (SP) that provides multimedia services to subscribers associated with subscriber devices 18, i.e., an SP network. ANs 14, A-PEs 16, BSR 12, and MPLS aggregation network 20 may comprise an SP domain. Although not illustrated, MPLS aggregation network 20 may be coupled to one or more networks administered by other providers, and may thus form part of a large-scale public network infrastructure, e.g., the Internet.

Subscriber devices 18 are coupled to ANs 14 of the SP domain via access lines 19A-19N (collectively, access lines 19). The SP domain uses BSR 12 to provide a variety of multimedia services to the subscribers associated with subscriber devices 18. For example, the SP domain may allow the subscribers to receive multicast streams on subscriber devices 18 via BSR 12. For example, the SP domain makes multicast streams available to the subscribers, and the subscribers request and receive multicast streams on their associated subscriber devices 18. Multicast streams may include, for example, video, audio, data, voice, or any combination thereof. The SP domain may also use BSR 12 to provide packet transmission according to a Quality of Service (QoS) class for particular unicast packet flows, such as Voice over Internet Protocol (VoIP) calls, for the subscribers. As another example, the SP domain may use BSR 12 to manage service profiles that vary from subscriber to subscriber. A service profile may define a one or more general Quality of Service (QoS) classes for all inbound or outbound packet traffic for a particular customer.

BSR 12 maintains multicast filter information that describes how received multicast packets should be replicated and forwarded to one or more of subscriber devices 18. BSR 12 updates multicast filter information based on messages received from subscriber devices 18 that indicate a desire to join or leave multicast groups, i.e., to receive or stop receiving multicast streams. For example, when a subscriber associated with subscriber device 18A requests a multicast stream, subscriber device 18A sends a multicast join message, e.g. an Internet Group Management Protocol (IGMP) host membership report requesting membership in the multicast group associated with the requested multicast stream, to a neighboring router, i.e., BSR 12. As an L2 device, i.e., a data link layer device, AN 14A forwards the join message to BSR 12 via the MPLS aggregation network. AN 14A may implement an L2 IGMP snooping function or similar to detect membership state and implement a multicast replication function. This function may be transparent to BSR 12.

BSR 12 may act as a B-RAS or a Broadband Network Gateway (BNG) for subscriber devices 18. Consequently, BSR 12 may authenticate the subscriber associated with subscriber device 18A, and determine whether the subscriber is authorized to receive the multicast stream. A server 22 available within SP domain may store information identifying subscribers and indicating what multicast streams the subscribers are authorized to receive. When a subscriber associated with one of subscriber devices 18 logs on or otherwise activates its multimedia service account, BSR 12 may query server 22 to authenticate the subscriber and receive authorization information for the subscriber. Server 22 may, for example, be a Remote Authentication Dial-In User Service (RADIUS) server. BSR 12 is a layer three (L3) network device that operates within the third layer of the OSI reference model, i.e., the network layer. Access nodes 14 are layer two (L2) network devices that operate within the second layer of the OSI reference model, i.e., the data link layer.

The techniques of the invention allow ANs 14 to forward subscriber frames through MPLS aggregation network 20 encapsulated in MPLS packets, i.e., packets conforming to the MPLS protocol, using MPLS labels. Moreover, access nodes 14 may implement a "light" or "thin" version of MPLS by implementing certain MPLS functions in a forwarding plane (i.e., data plane) of the access nodes 14 without fully implementing the L3 portions of the MPLS protocol within a control place of access nodes 14. In this manner, the L2 access nodes 14, which typically are not configured to support network protocols that operate above the second layer of the network stack, may operate to inject MPLS traffic into MPLS aggregation network 20 without being reconfigured to fully implement the MPLS protocol.

In this example, ANs 14 implement MPLS in the data plane to forward subscriber frames from subscriber devices 18 to A-PEs 16 using MPLS labels instead of VLAN tags to indicate the forwarding path through the MPLS aggregation network. ANs 14 indicate which subscriber device 18 is requesting the services by allocating a subscriber label that designates the access line 19 associated with the subscriber device 18, and attaching the subscriber label to the subscriber frames. Although generally used to describe labels that indicate the forwarding path through the MPLS aggregation network, the term "MPLS label" may also encompass the "subscriber label" that identifies the subscriber in relation to a specific access node.

ANs 14 may be configured to store pools of subscriber labels, from which ANs 14 may allocate specific subscriber labels to specific access lines 19. In a first embodiment, ANs 14 provide an interface by which an administrator or software agent may define and maintain pools of subscriber labels and MPLS labels for use in the forwarding plane. The pools of subscriber labels may be predefined, i.e., are not dynamically installed using MPLS signaling in the control plane. In this embodiment, ANs 14 autonomously allocate the subscriber labels to the access lines 19, and the allocation may not be coordinated across the ANs 14. In a second embodiment, the subscriber label pools are dynamically configured on ANs 14 by BSR 12 via a protocol that allows an L3 device to control provision of L2 functionality by an L2 device. For example, BSR 12 may configure ANs 14 using a protocol such as the Layer Two Control Protocol (L2CP), also known as the Access Node Control Protocol (ANCP). In the second embodiment, an administrator may configure BSR 12 by specifying L2CP connections for which BSR 12 should assign pools of subscriber labels. BSR 12 then assigns a non-overlapping range of subscriber labels to each AN 14 associated with the specified L2CP connections. Although the second embodiment is described below with respect to L2CP, any protocol that allows an L3 device (e.g., BSR 12) to control provision of L2 functionality by an L2 device (e.g., ANs 14) may be used. In any case, however, ANs 14 need not fully implement the MPLS protocol within the control plane of the access nodes. That is, access nodes 14 need not execute the L3 portions of the MPLS protocol to negotiate LSPs and distribute and/or receive label to/from downstream devices, such as A-PEs 16 and BSR 12. Examples of the L3 portions of the MPLS protocol that need not be implemented in the control plane of ANs 14 include the L3 signaling portions of MPLS that utilize or exchange routing information with peer L3 devices.

In operation, AN 14A receives a request for services (e.g., multicast transmissions) from subscriber device 18B, which may be a subscriber frame. If AN 14A has not previously received communications from subscriber device 18B, AN 14A allocates a new subscriber label to the subscriber device 18B (i.e., to access line 19B over which the request was received) from the subscriber label pool configured by one of the methods described above. AN 14A attaches the subscriber label to the subscriber frame, and encapsulates the frame in an MPLS packet, adding a further MPLS label that indicates a BSR that provides access to the service with which the frame is associated, and which by implication indicates the path by which the subscriber frame should be forwarded through MPLS aggregation network 20. AN 14A sends the MPLS packet to A-PE 16A, which swaps the outer MPLS label with a pseudowire label, and forwards the packet along an MPLS pseudowire (indicated as dashed lines in FIG. 1) to BSR 12. In this manner, MPLS may be used throughout the SP domain for forwarding from ANs 14 to BSR 12, while requiring implementation of MPLS in only the data plane of ANs 14.

The configuration of network environment 10 illustrated in FIG. 1 is merely exemplary. For example, MPLS aggregation network 20 may include more than one BSR 12. As another example, A-PEs 16 may be coupled to any number of ANs 14A. Further, switches 24 may each be coupled to any number of subscriber devices 26. MPLS aggregation network 20 may include additional devices, such as routers and switches (not shown), to route packets across MPLS aggregation network 20.

Figure 2:
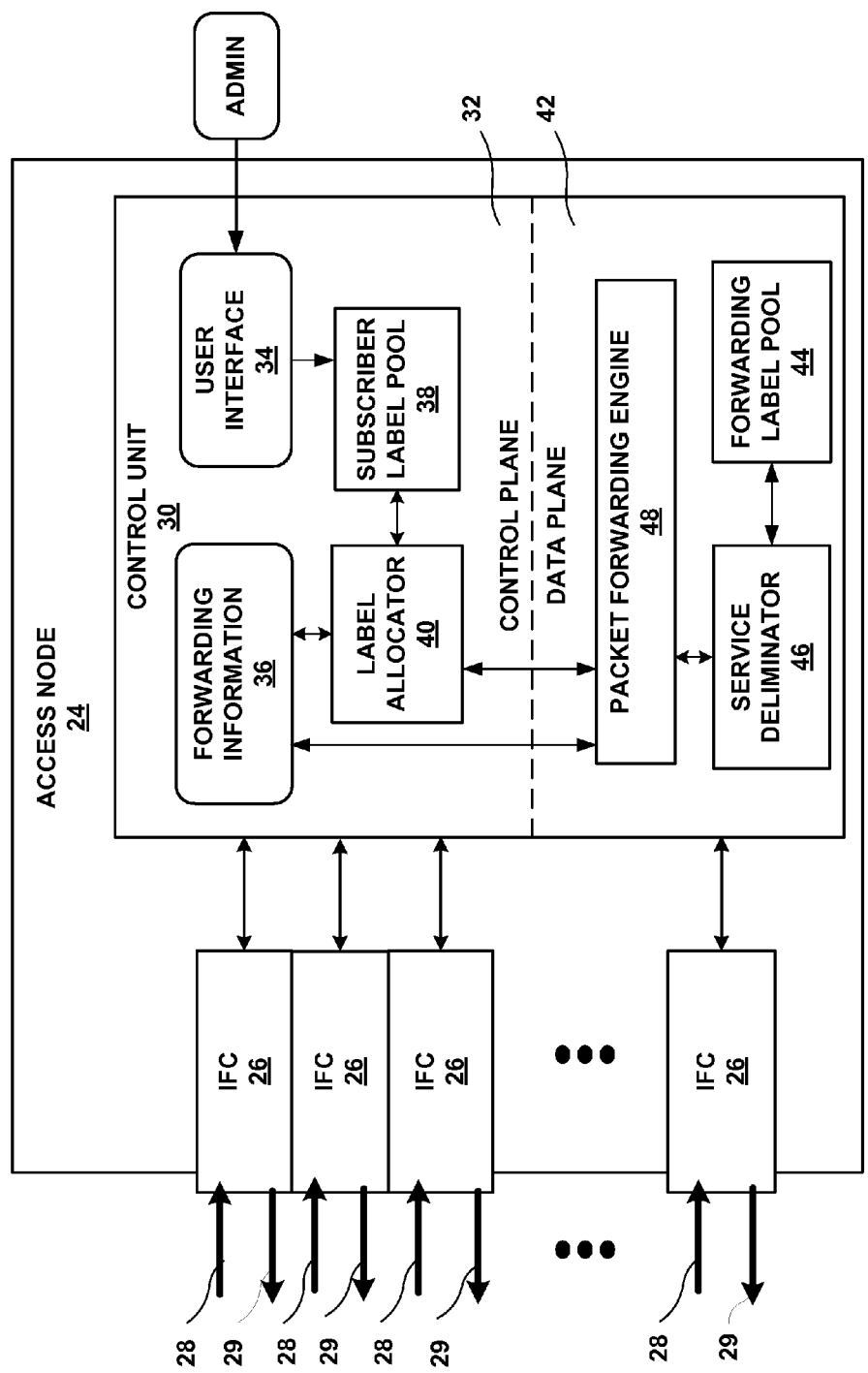
FIG. 2 is a block diagram illustrating an example AN that maintains a pool of labels and autonomously allocates the labels to subscriber access lines.

FIG. 2 is a block diagram illustrating an example AN 24 that maintains a pool of subscriber labels and autonomously allocates the labels to subscriber access lines in accordance with one embodiment of the invention. AN 24 may be, for example, a DSLAM, CMTS, or Ethernet bridge, as described above. AN 24 includes IFCs 26 that receive and send flows of ATM cells or Ethernet frames via links 28 and 29, respectively. AN 24 is logically represented as being separated into a control plane 32 (i.e., the hardware and software components that provide an operating environment for protocols for communication with peer devices) and a data plane 42 (i.e., the hardware and software components handling data forwarding).

In accordance with one embodiment of the invention, an administrator configures AN 24 via user interface 34. The administrator may configure or update subscriber label pool 38 to assign a pool of subscriber labels from which AN 24 may draw to allocate labels to subscriber devices 18. The administrator may also configure forwarding label pool 44 via user interface 34. Forwarding label pool 44 may contain MPLS labels that are associated with particular services or paths through MPLS aggregation network 20.

In general, AN 24 receives cells or frames from network links 28, and forwards the cells or frames via network links 29 based on information contained in the header of the cells, frames, or encapsulated packets. More specifically, upon receiving an inbound cell or frame, a respective one of IFCs 26 relays the cell or frame to a control unit 30. Control unit 30 identifies an appropriate outbound link 29 on which to forward the received cell or frame by comparing information in the header of the cell or frame to forwarding information 36 maintained by control unit 30. In some cases, control unit may reencapsulate, i.e. modify the header, of the cell or frame to forward the cell or frame to a particular path through MPLS aggregation network 20 indicated by the forwarding information 36.

Service deliminator 46 examines the received frame to determine a characteristic associated with the request, such as a type of service requested by the subscriber device 18. Based on the characteristic associated with the request, service deliminator 46 selects a forwarding label, e.g., an MPLS forwarding label, from forwarding label pool 44. The MPLS forwarding label indicates a path through MPLS aggregation network 20 to a particular BSR 12. Different BSRs may be associated with different services, such as voice, video, audio, and data. Moreover, different BSRs may be associated with different types of service, such as residential service or business service. For example, service deliminator 46 may deduce the appropriate MPLS label value based on the configuration of the access line 19 on AN 24. Although illustrated as residing in the data plane, in some aspects service deliminator 46 and forwarding label pool 44 may form a part of the control plane. For example, service deliminator 46 may act based on configured control plane information that defines services and forwarding labels.

When a frame is received from a subscriber device 18 for which AN 24 does not have an entry in forwarding information 36, label allocator 40 allocates a label from subscriber label pool 38 to the subscriber device 18 (i.e., to the access line 19 associated with the subscriber device 18). The subscriber label uniquely identifies the subscriber device 18 with respect to access node 24. Label allocator 40 updates forwarding information 36 to associate the allocated subscriber label with the subscriber device 18. In this manner, access node 24 autonomously allocates labels to subscriber devices 18 from a pool of subscriber labels. Control unit 30 forms the subscriber frames into a packet and adds the subscriber label selected by label allocator 40 and the MPLS label selected by service deliminator 46 to the frame received from subscriber device 18. Control unit 30 may also add an Ethernet header or other header. Packet forwarding engine 48 forwards the packet to an A-PE 16 via the appropriate outbound link 29.

Control unit 30 may include one or more microprocessors, DSPs, ASICs, FPGAs, or other logic circuitry. Control unit 30 may include memory (not shown) that stores computer-readable program instructions that cause control unit 30 to perform the functions ascribed to it herein. The memory may include any magnetic, optical, or electrical media, such as a RAM, ROM, hard disk, CD-ROM, or EEPROM. Control unit 30 may maintain subscriber label pool 38, forwarding label pool 44, and forwarding information 36 in memory in the form of one or more tables, databases, link lists, radix trees, databases, flat files, or any other data structures.

Figure 3:
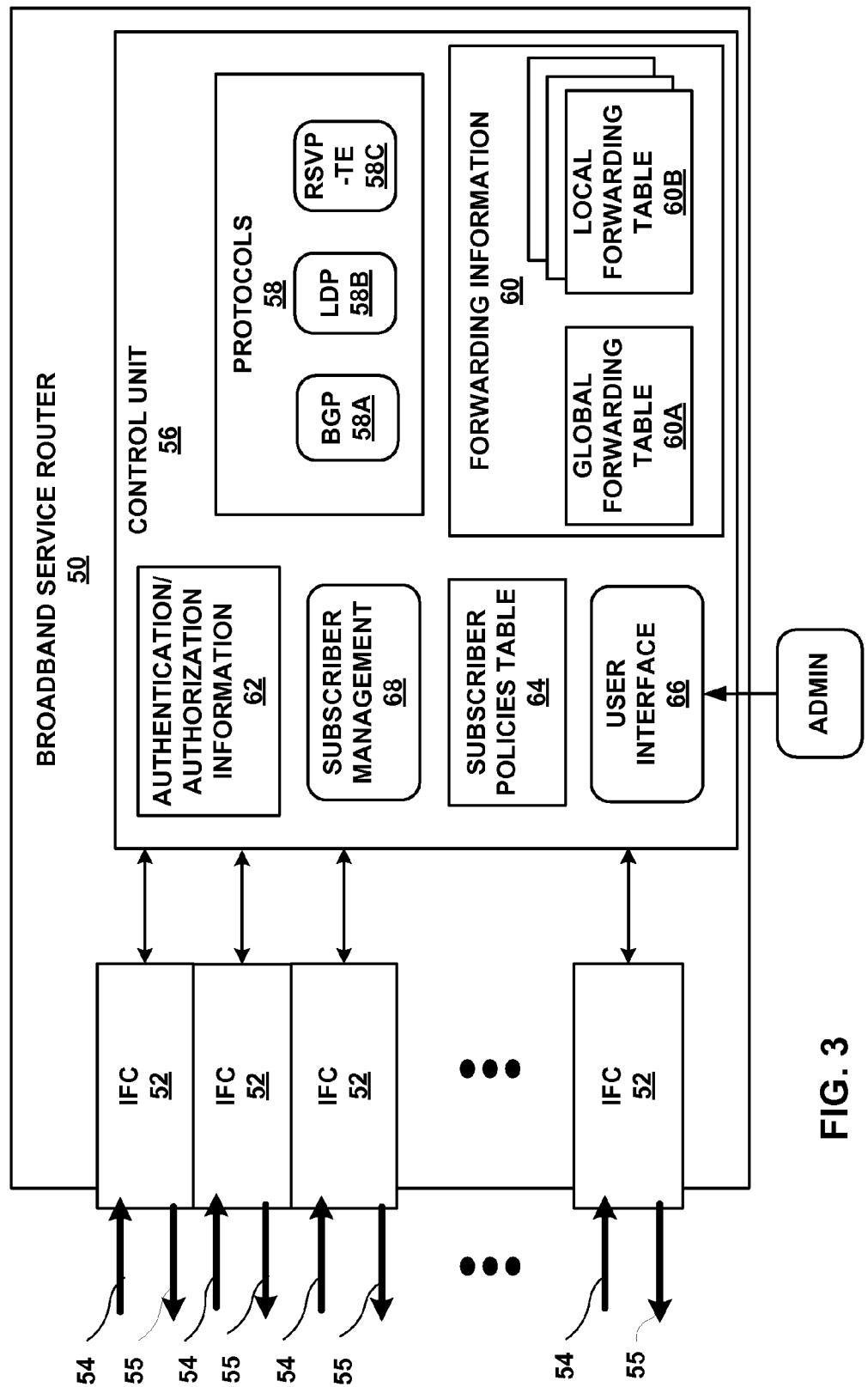
FIG. 3 is a block diagram illustrating an example BSR that provides broadband services to access nodes via an MPLS network.

FIG. 3 is a block diagram illustrating an example BSR 50 that provides broadband services to subscriber devices 18 via MPLS aggregation network 20. BSR 50 includes interface cards 52 that send and receive packet flows via network links 54 and 55, respectively. IFCs 52 are typically coupled to network links 54, 55 via a number of interface ports (not shown). BSR 50 may include a chassis (not shown) having a number of slots for receiving a set of cards, including IFCs 52. Each card may be inserted into a corresponding slot of a chassis for electrically coupling the card to a control unit 56 via a bus, backplane, or other electrical communication mechanism. BSR 50 may be, for example, a B-RAS, a BNG, or other routing device.

In general, BSR 50 receives inbound packets from network links 54, determines destinations for the received packets, and outputs the packets on network links 55 based on the destinations. More specifically, upon receiving an inbound packet via one of inbound links 54, a respective one of IFCs 52 relays the packet to control unit 56. In response, control unit 56 reads a block of data from the packet, referred to as the "key," which may include an IP address of the destination for the packet, and forwards the packet based on the key. BSR 50 may also implement a number of subscriber management functions before forwarding inbound packets.

BSR 50 maintains routing information (not shown) that describes the topology of MPLS aggregation network 20, i.e., the routes through MPLS aggregation network 20. BSR 50 exchanges routing information with other routing devices within MPLS aggregation network 20, thereby learning routes through the network. BSR 50 may exchange information with other routing devices in accordance with one or more signaling protocols 58, such as the Border Gateway Protocol (BGP) routing protocol 58A, the Label Distribution Protocol 58B, and the Resource Reservation Protocol with Traffic Engineering Extensions (RSVP-TE) 58C. BSR 50 may include other signaling protocols 58 not shown.

Control unit 56 generates forwarding information 60 based on routing information and subscriber management information. For example, control unit 56 may determine forwarding information for a given subscriber by configuration information or reactively upon setup of a subscriber session, in conjunction with routing information. Control unit 56 selects routes for packets, e.g., determines which output links 55 on which to forward the packets, by comparing the keys of the packets to forwarding information 60. Forwarding information 60 includes information identifying a next hop and an associated output interface to which to forward packets that match a particular key. In the example of FIG. 3, forwarding information 60 includes global forwarding table 60A and a plurality of local forwarding tables 60B.

Subscriber management module 68 handles MPLS packets encapsulating subscriber frames from subscriber devices 18 in accordance with forwarding information 60 and subscriber policies table 64. Subscriber management module 68 looks up an outer label of a received MPLS packet in global forwarding table 60A to determine in which of the plurality of local forwarding tables 60B to look up an inner label of the packet. In this manner, subscriber management module 68 can determine the appropriate label space in which to interpret the packet. Local forwarding table 60B contains forwarding information specific to the particular MPLS paths defined for the MPLS aggregation network 20. Subscriber management module 68 looks up the subscriber label of the packet in local forwarding table 60B to determine how to forward the packet Control unit 56 maintains multicast filter information (not shown), and authentication/authorization information 62 received from server 22 (FIG. 1). Control unit 56 also maintains subscriber policies table 64. Subscriber policies table 64 includes policies for subscriber management, such as Quality of Service (QoS) policies, accounting policies, or other policies. An administrator may configure or update subscriber policies table 64 via user interface 66. Control unit may also update subscriber policies table 64 with subscriber information received at the time of a positive authentication result. Control unit 56 receives multicast join/leave messages, e.g., IGMP host membership reports, from subscriber devices 18 via links 54 and IFCs 52. IGMP conveys information to identify the subscriber device and multicast group to be joined or left. For example, multicast join/leave message may include a source IP address of the requesting one of subscriber devices 18, a destination IP address identifying the multicast group associated with requested multicast stream, and the requested action, i.e., join or leave. Control unit 56 updates the multicast filter information based on received join/leave messages, and replicates and forwards received multicast packets based on the multicast filter information.

When BSR 50 receives a multicast join/leave message from one of subscriber devices 18, BSR 50 may access the authentication and authorization information 22 to verify that a user associated with the subscriber device 18 is authenticated and authorized to receive the requested multicast stream. BSR 50 updates the multicast filter information to indicate that the requested multicast stream is to be replicated and forwarded to the subscriber device 18.

Control unit 56 may include one or more microprocessors, DSPs, ASICs, FPGAs, or other logic circuitry. Control unit 56 may include memory (not shown) that stores computer-readable program instructions that cause control unit 56 to perform the functions ascribed to it herein. The memory may include any magnetic, optical, or electrical media, such as a RAM, ROM, hard disk, CD-ROM, or EEPROM. Control unit 56 may maintain authentication/authorization information 62, subscriber policies table 64, and forwarding information 60 in memory in the form of one or more tables, databases, link lists, radix trees, databases, flat files, or any other data structures.

Figure 4:
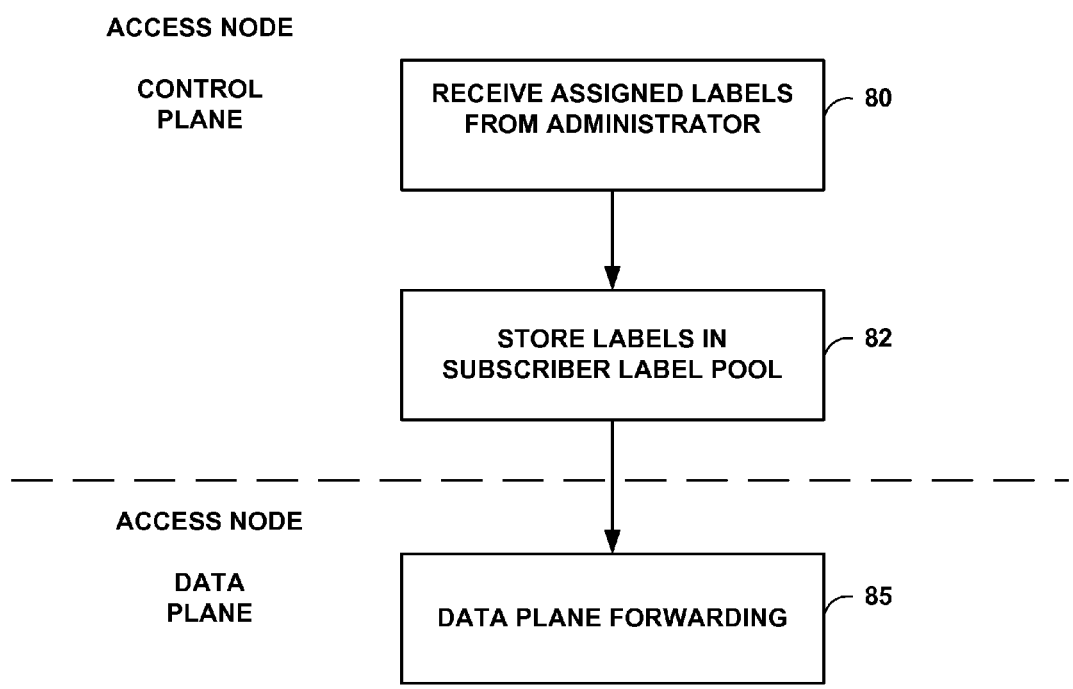
FIG. 4 is a flowchart illustrating an exemplary method of configuring the pool of labels on the AN.

FIG. 4 is a flowchart illustrating an exemplary method of configuring subscriber label pool 38 on AN 24 of FIG. 2. In this embodiment, AN 24 receives configuration information from an administrator of the SP domain or from an automated software agent. In either case, the configuration information specifies operations for maintaining a pool of labels for AN 24 to use for identifying communications as originating from particular subscriber devices 18 (80). AN 24 stores the labels in subscriber label pool 38 (82). AN 24 proceeds to receive and forward data in the data plane, as described in further detail below (85). As shown in FIG. 4, the steps of receiving and storing assigned labels occur in the control plane of access node 24 without requiring MPLS signaling with peer devices, while forwarding data using the labels occurs in the data plane of access node 24.

Referring to ANs 14 of FIG. 1, the administrator may configure each of ANs 14 with a different set or range of labels, or may configure ANs 14 with identical or overlapping sets or ranges of labels. In this embodiment of the invention, allocation of subscriber labels is not coordinated across ANs 14. As a result, A-PEs 16 will allocate one AN 14 and one pseudowire per port of A-PE 16. In this manner, BSR 12 is able to differentiate between subscriber devices 18 even where overlapping labels are used by ANs 14, based on the combination of subscriber label and the MPLS pseudowire (also referred to as an MPLS tunnel) on which the frame is received. Alternatively, more than one pseudowire may be allocated per port of A-PE 16, using multiplexing based on the MPLS forwarding label to allow a many-to-one relationship between ANs and BSRs.

Figure 5:
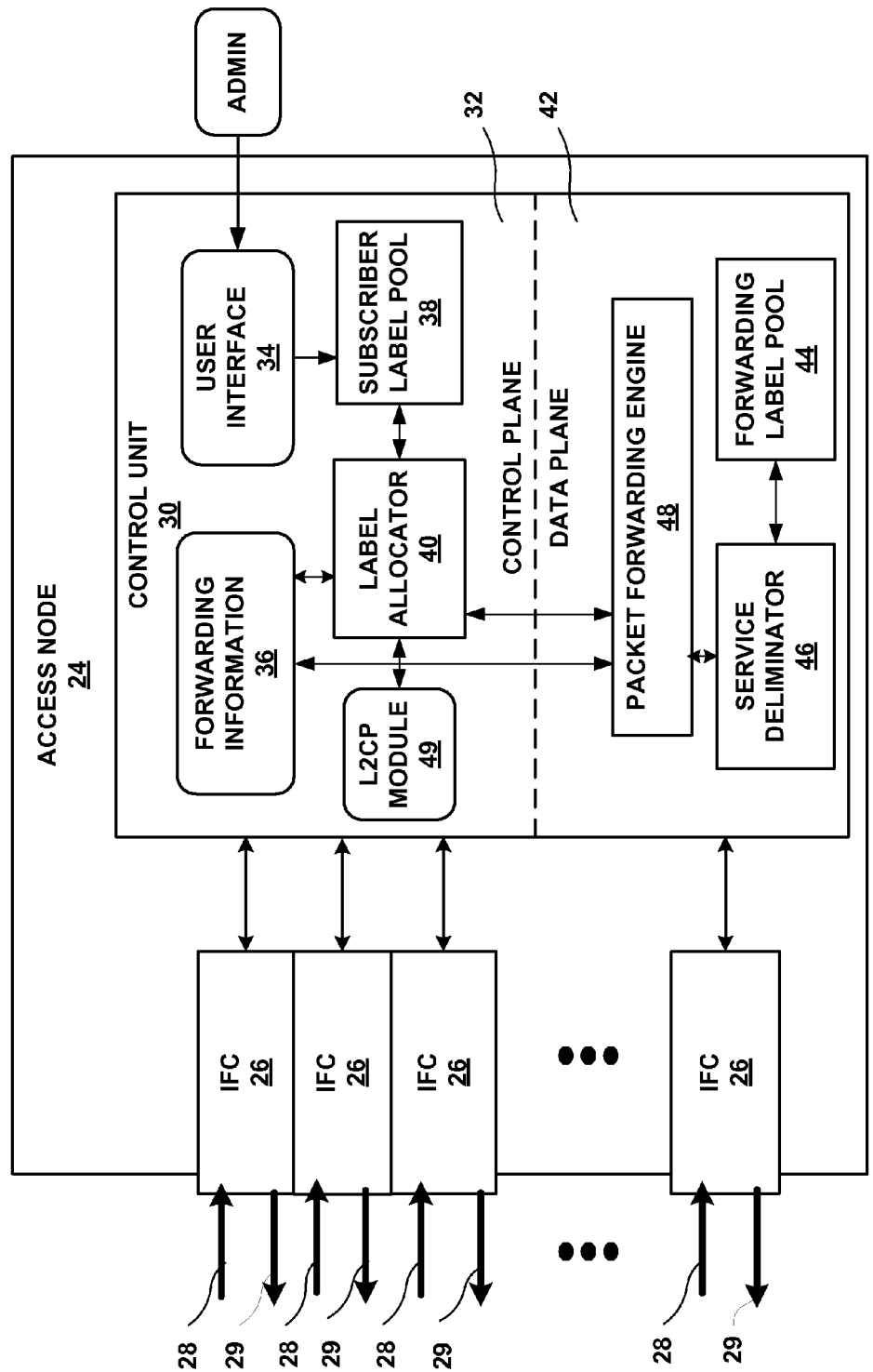
FIG. 5 is a block diagram illustrating an example AN that receives an assigned pool of labels via a protocol that allows a layer three (L3) device to control provision of layer two (L2) functionality by a L2 device.

FIG. 5 is a block diagram illustrating another example AN 24 that receives an assigned pool of labels from BSR 12 via a protocol that allows an L3 device to control provision of L2 functionality by a L2 device, in accordance with one embodiment of the invention. An administrator configures AN 24 via user interface 34 to support the use of L2CP for upstream label assignment. For example, AN 24 uses L2CP module 49 to receive control messages from BSR 12 via L2CP. The control messages may include a pool of subscriber labels assigned to AN 24 by BSR 12. The control messages may also include a pool of MPLS labels. Upon receiving the L2CP control messages, AN 24 stores the pool of labels in subscriber label pool 38, and stores the pool of MPLS labels in forwarding label pool 44. In this fashion, control plane 32 of AN 24 need not execute L3 software necessary to implement MPLS signaling to dynamically assign or receive labels from peer devices, yet allows for centralized management of the MPLS services implemented in data plane 42 of the access node.

Control unit 30 operates in a manner similar to that described above, by using label allocator 40 to allocate one of the stored subscriber labels to a subscriber device 18 upon receiving a request for services from the subscriber device 18. The remaining components of AN 24 of FIG. 5 may operate substantially similar to those of AN 24 of FIG. 2, and thus will not be discussed separately.

Control unit 30 may also use L2CP module 49 to dynamically configure multicast filter information (not shown) based on additional control messages received from BSR 12. The additional control messages may identify the path on which packets for the requested multicast stream will be sent to AN 24, or the multicast MAC address assigned to the requested multicast stream by BSR 12. The control messages also identify an associated subscriber device 18 and the requested action, i.e. join or leave. The associated subscriber device 18 may be identified by using a MAC address of the requesting subscriber device or by using a text-based subscriber line ID.

Figure 6:
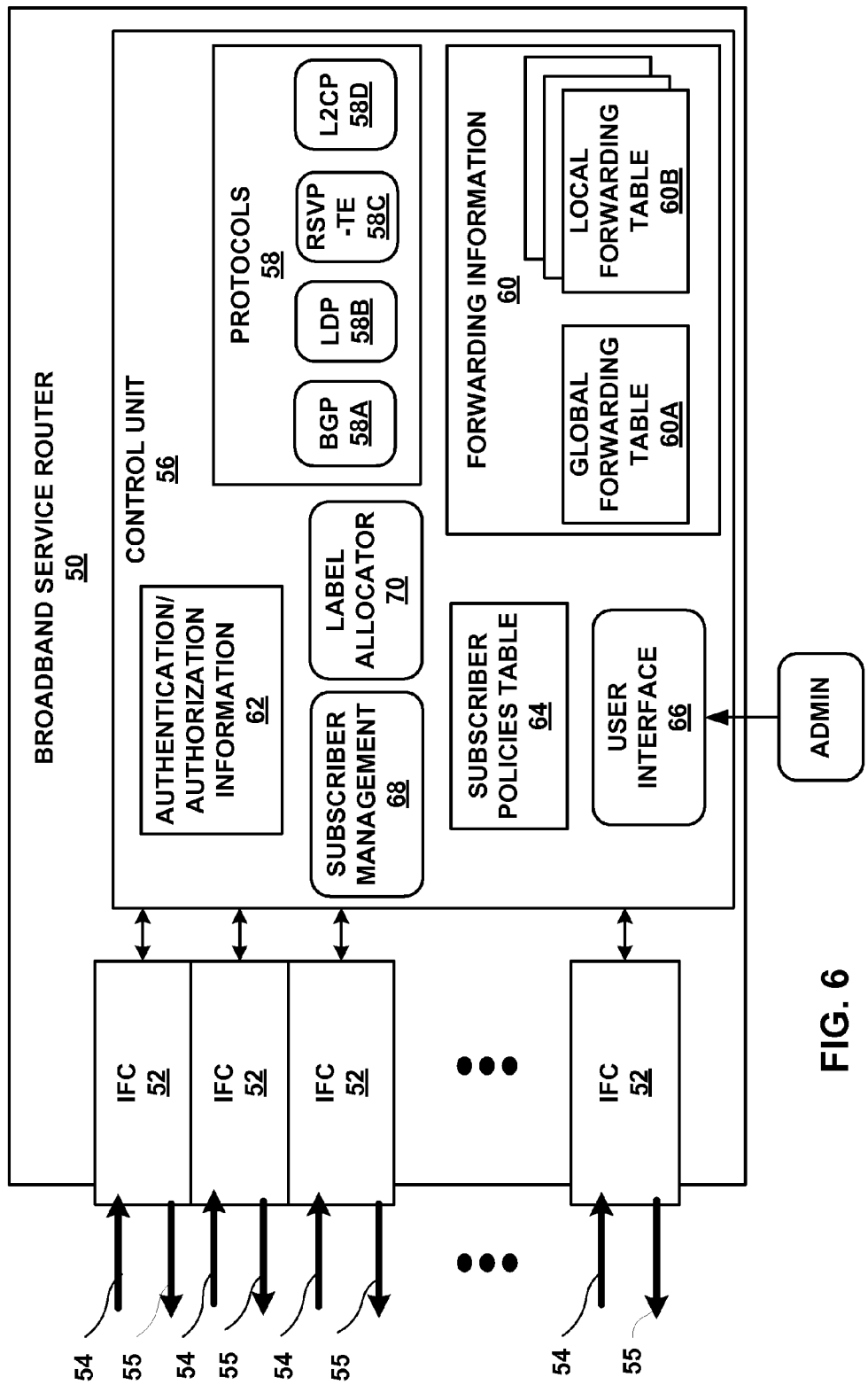
FIG. 6 is a block diagram illustrating an example BSR that dynamically allocates the pool of labels to the AN of FIG. 5 via the layer two control protocol, and provides broadband services to access nodes via an MPLS network.

FIG. 6 is a block diagram illustrating an example BSR 50 having a label allocator 70 that dynamically allocates the pool of subscriber labels to AN 24 of FIG. 5 via L2CP, and provides broadband services to subscriber devices 18 (FIG. 1) via MPLS aggregation network 20. An administrator configures BSR 50 via user interface 66 to support the use of L2CP for upstream label assignment. The administrator may further configure BSR 50 to indicate certain L2C connections for which BSR 50 should start using upstream assigned labels. BSR 50 accesses the local loop identifiers for these L2C connections from server 22, and determines which of ANs 14 are associated with these L2C connections. Label allocator 70 assigns a range of upstream labels to each of the appropriate ANs 14, and uses L2CP module 58D to send control messages containing the assigned labels to the ANs 14 via L2CP.

In one embodiment, AN 24 still performs autonomous allocation of subscriber labels, but draws from the subscriber label pool 38 dynamically populated by BSR 50. In another embodiment, label allocator 70 of BSR 50 may even control allocation of particular subscriber labels to particular access lines 19 via L2CP. In this case, BSR 50 would not need to maintain separate local forwarding tables 60B.

BSR 50 may also may use label allocator 70 and L2CP 58D to control the MPLS forwarding label scheme, which avoids manual configuration of the MPLS forwarding label pool 44 on ANs 14. Label allocator 70 can map labels to specific access lines or specific frames received on a given access line. BSR 50 may use L2CP 58D to provide further information to ANs 14, such as EXP bits to be used. BSR 50 may further use L2CP 58D to control the performance of multicast elaboration by ANs 14, in accordance with conventional L2CP functionality. The remaining components of BSR 50 of FIG. 6 may operate substantially similar to those of BSR 50 of FIG. 3, and thus will not be discussed separately.

Figure 7:
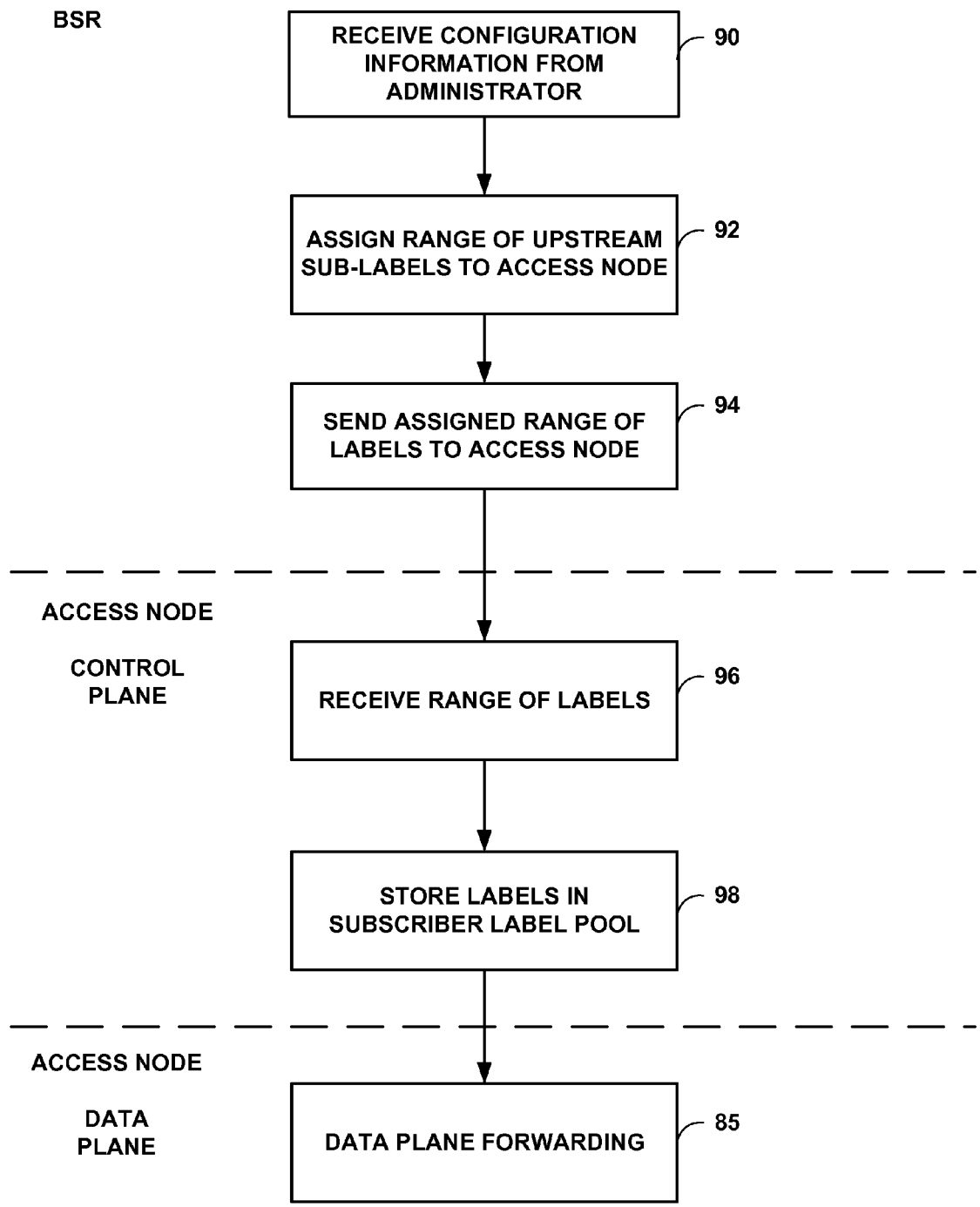
FIG. 7 is a flowchart illustrating an exemplary method of configuring the pool of labels on the AN.

FIG. 7 is a flowchart illustrating an exemplary method of configuring subscriber label pool 38 on AN 24 of FIG. 4. In this embodiment, BSR 50 of FIG. 5 receives configuration information from an administrator (90). The configuration information includes an indication of L2C connections for which BSR 50 should start using upstream assigned labels, from which BSR 50 determines associated ANs 14 to which to assign subscriber labels, as discussed above. For example, assume the administrator indicates that BSR 50 should assign and communicate subscriber labels to AN 24. BSR 50 assigns a range of upstream subscriber labels to AN 24 (92), and sends the assigned range of labels to access node via L2CP (94).

AN 24 receives the range of labels (96), and stores the labels in subscriber label pool 38 (98). AN 24 proceeds to receive and forward data in the data plane, as described in further detail below (85). As shown in FIG. 7, the steps of receiving and storing assigned labels occur in the control plane of access node 24, while forwarding data occurs in the data plane of access node 24. Referring to ANs 14 of FIG. 1, BSR 12 may assign non-overlapping ranges of labels to each of ANs 14, thus coordinating allocation of subscriber labels across ANs 14. This allows each AN 14 connected to the same A-PE 16 (e.g., ANs 14A and 14B) to share one MPLS pseudowire when communicating with BSR 12, since the subscriber labels will be unique across the ANs 14.

Figure 8:
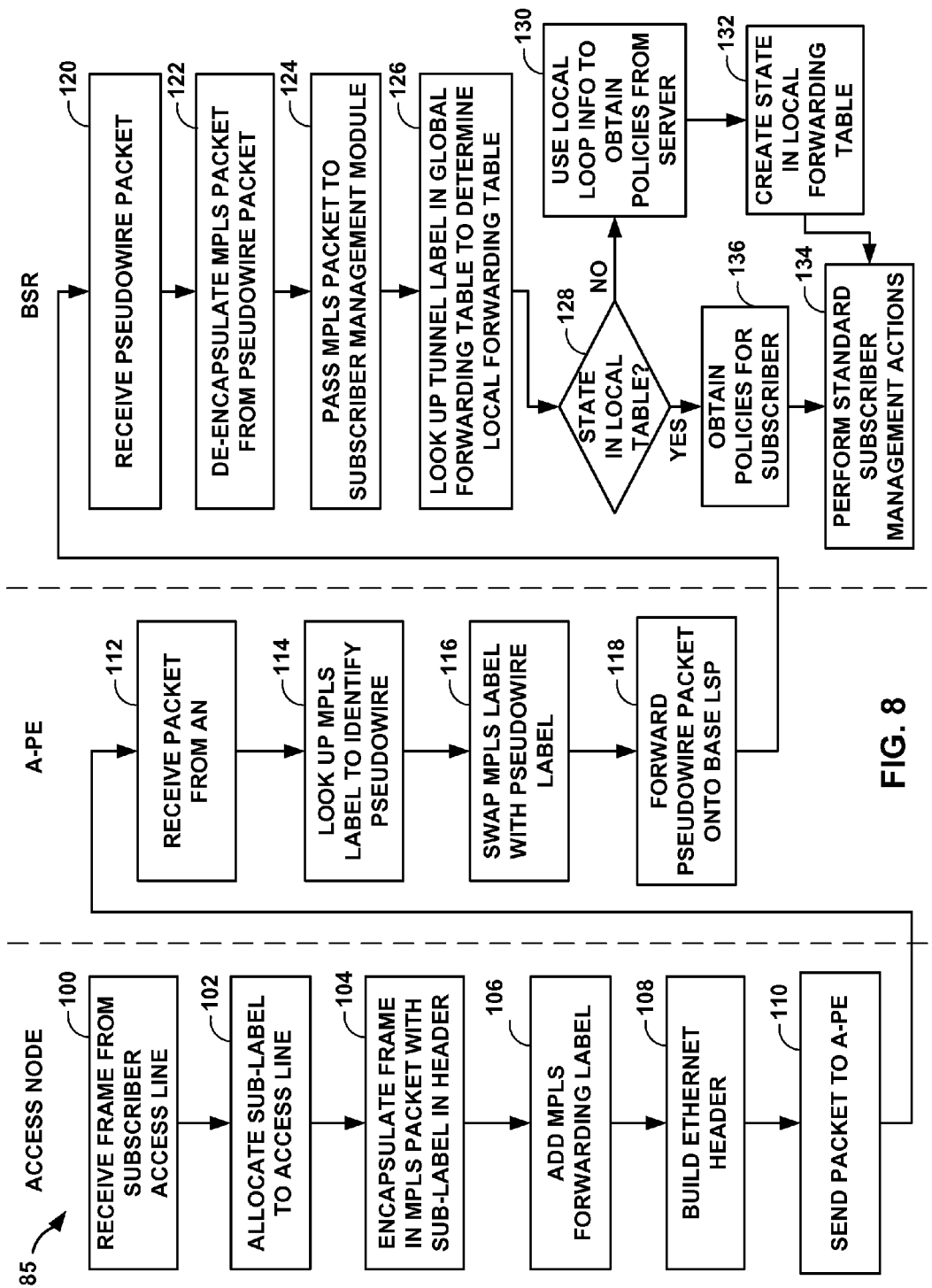
FIG. 8 is a flowchart illustrating exemplary operation of network devices in the broadband networking environment forwarding a subscriber request from the subscriber to the BSR.

FIG. 8 is a flowchart illustrating exemplary operation of network devices in example networking environment 10 of FIG. 1 while forwarding a subscriber request from the subscriber device 18 to BSR 12. In particular, steps 100-110 of FIG. 8 illustrate the data plane forwarding step (85) of AN 24 referred to with respect to FIGS. 4 and 7. For example, in operation, AN 14A may receive a request for services (e.g., broadband services) from subscriber device 18B via subscriber access line 19B (100). The request may be in the form of a subscriber frame. AN 14A uses label allocator 40 to select a subscriber label from subscriber label pool 38 and allocate the subscriber label ("sub-label") to access line 19B (i.e., to subscriber device 18B) (102). If AN 14A has previously received communications from subscriber device 18B, AN 14A uses the same subscriber label that AN 14A previously allocated to subscriber device 18B.

AN 14A encapsulates the subscriber frame in an MPLS packet with the allocated subscriber label in the header (104), and adds an MPLS forwarding label (106). The MPLS forwarding label is selected by service deliminator 46 upon determining a type of service associated with the request frame. Service deliminator 46 selects the appropriate MPLS forwarding label by accessing forwarding label pool 44. AN 14A builds an Ethernet header for the packet (108), and sends the packet to A-PE 16A (110). As illustrated in FIG. 8, AN 14A performs MPLS forwarding using data plane functionality, without implementing MPLS in the control plane.

A-PE 16A receives the packet from AN 14A (112), and looks up the MPLS forwarding label to identify a pseudowire associated with the MPLS forwarding label (114). A-PE 16A swaps the MPLS forwarding label with a label associated with the pseudowire (116). The administrator may configure A-PE 16A to associate MPLS forwarding labels with pseudowires. A-PE 16A forwards the pseudowire packet onto a base LSP that traverses MPLS aggregation network 20 (118). The base LSP takes the packet to BSR 12.

BSR 12 receives the pseudowire packet from A-PE 16A (120), and de-encapsulates the MPLS packet from the pseudowire packet (122). BSR 12 passes the packet to subscriber management module 68 (124). Subscriber management module 68 looks up a pseudowire label on the packet in global forwarding table 60A to determine the appropriate local forwarding table 60B that provides the context in which to interpret the packet (126). Subscriber management module 68 then looks up the subscriber label in the indicated local forwarding table 60B.

If state does not exist for the subscriber label in the local forwarding table 60B indicated by the global forwarding table (NO branch of 128), subscriber management module 68 uses the information that identifies the subscriber, which may be based on local loop id or some upper layer information (e.g., source IP, PPP username/password, or other upper layer information) contained in the subscriber frame to determine information about the services for subscriber device 18B, such as policies (130). Subscriber management module 68 then creates state in the local forwarding table 60B for the subscriber label (132), and performs standard subscriber management actions, such as accessing multicast or other services to be sent to subscriber device 18 in accordance with the request (134). If state does exist for the subscriber label in the local forwarding table 60B (YES branch of 128), subscriber management module 68 obtains the policies associated with the subscriber label (136), and performs standard subscriber management actions in accordance with the request (134).

Figure 9:
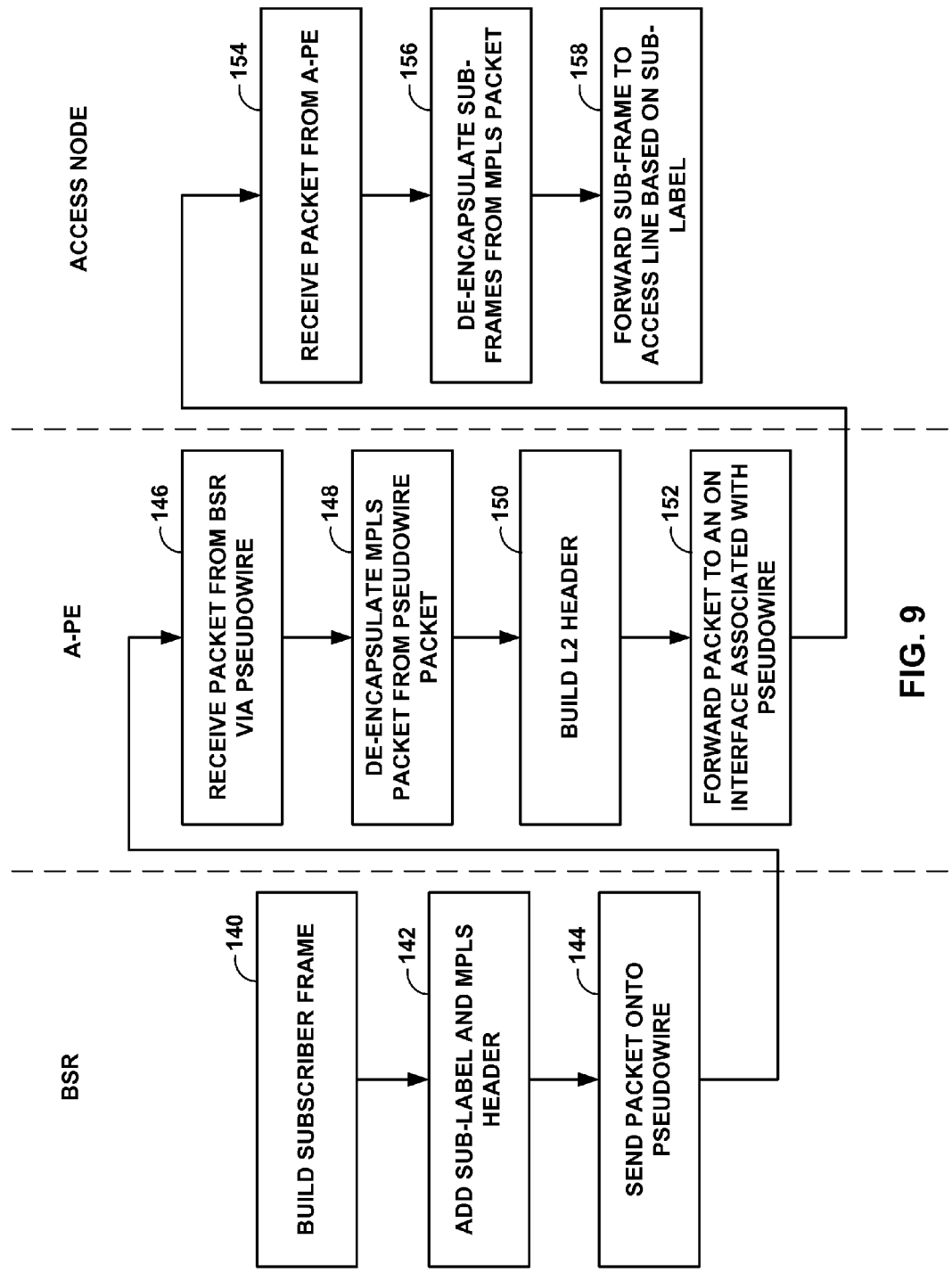
FIG. 9 is a flowchart illustrating exemplary operation of network devices in the broadband networking environment forwarding a response to the subscriber request from the BSR to the subscriber.

FIG. 9 is a flowchart illustrating exemplary operation of network devices in example networking environment 10 while forwarding a response to the subscriber request from the BSR 12 to the subscriber device 18B. BSR 12 builds a subscriber frame based on information in local forwarding table 60B and subscriber policies table 64 (140). This information may have been auto-sensed by BSR 12, or configured by an administrator. BSR 12 adds a subscriber label from local forwarding table 60B, and an MPLS header to the subscriber frame (142), and sends the packet onto the appropriate pseudowire (144).

A-PE 16A receives the packet from BSR 12 via the MPLS pseudowire (146). A-PE 16A de-encapsulates the MPLS packet from the pseudowire packet (148), builds an L2 header for the packet (150), and forwards the packet to AN 14A on an interface associated with the MPLS pseudowire (152). Similar to PHP, A-PE 16A pops the pseudowire MPLS label on the MPLS packets, but leaves the MPLS packets with the subscriber label and adds an Ethernet header destined for the AN. AN 14A receives the MPLS packet from A-PE 16A (154), and de-encapsulates the subscriber frames from the MPLS packet (156). AN 14A forwards the subscriber frame onto access line 19B based on the subscriber label (158). Subscriber device 18B receives the subscriber frame. As shown, AN 14A can use upstream-allocated labels without the use of a dynamic signaling protocol, e.g., MPLS, in the control plane. AN 14A only needs limited data plane implementation of MPLS.

Various embodiments of the invention have been described. For example, although described for exemplary purposes with respect to a broadband network environment, the principles of the invention may be readily applied to other network environments. For example, the principles may be applied to access nodes for mobile-based networks or third generation (3G) cellular networks. These and other embodiments are within the scope of the following claims.

The invention claimed is:

1. A method comprising:
receiving configuration information on a layer two (L2) network device via an L2 control protocol that allows a layer three (L3) network device to control provision of L2 functionality by the L2 network device, wherein the configuration information specifies a set of subscriber labels to be individually allocated to access lines that extend between subscriber devices and the L2 network device and provide the subscriber devices with access to the L2 network device, wherein the configuration information specifies individual allocation by the L3 network device of subscriber labels to access lines, and wherein the subscriber labels uniquely identify the subscriber devices associated with the access lines;
receiving an L2 frame from a subscriber device coupled via an access line to the L2 network device;
with the L2 network device, selecting a subscriber label for the subscriber device based on the individual allocation specified by the configuration information, wherein the selected subscriber label uniquely identifies the subscriber device associated with the access line;
with the L2 network device, selecting a Multi-Protocol Label Switching (MPLS) label to apply to the L2 frame from a set of MPLS labels, wherein the selected MPLS label is associated with the L3 network device;
applying the selected subscriber label and the selected MPLS label in a data plane of the L2 network device to the received L2 frame to form an MPLS packet, wherein the subscriber label is applied as an inner label and the MPLS label is applied as an outer label of the MPLS packet; and
outputting the MPLS packet from the L2 network device to an MPLS network.

2. The method of claim 1, wherein receiving configuration information comprises receiving the configuration information using the L2 control protocol without executing an MPLS signaling protocol within a control plane of the L2 network device.

3. The method of claim 2, wherein receiving configuration information comprises receiving the configuration information using the L2 control protocol without executing Layer 3 portions of the MPLS signaling protocol within the control plane of the L2 network device.

4. The method of claim 1,
wherein receiving an L2 frame comprises receiving a request via one of the access lines from one of the subscriber device for network services; and
wherein outputting the MPLS packet comprises forwarding the request as an MPLS packet to the MPLS network in response to receiving the request.

5. The method of claim 1, further comprising:
receiving a request via an access line from a subscriber device for network services; and
determining a type of network service requested,
wherein selecting the MPLS labels for the access lines comprises selecting an MPLS label based on the determination.

6. The method of claim 5, wherein the type of network service requested is one of voice, video, audio, or data network services.

7. The method of claim 1, further comprising configuring the L2 network device and the L3 network device to support the use of the L2 control protocol for receiving the configuration information.

8. The method of claim 1, wherein receiving and applying the MPLS labels comprises receiving and applying the MPLS labels without exchanging label information using an MPLS signaling protocol.

9. The method of claim 1, wherein receiving configuration information on an L2 network device via an L2 control protocol comprises receiving configuration information on an access node via an L2 control protocol that allows a broadband services router to control provision of L2 functionality by the access node.

10. The method of claim 1, further comprising receiving configuration information on the L2 network device from the L3 network device via the L2 control protocol that specifies allocation by the L3 network device of the MPLS labels to the access lines, wherein selecting the MPLS labels for the access lines comprises selecting the MPLS labels according to the specified allocation by the L3 network device.

11. The method of claim 1, wherein switching the MPLS packet from the L2 network switch to an MPLS network comprises applying an Ethernet header to the MPLS packet, and outputting the MPLS packet having the Ethernet header to a provider edge device of the MPLS network positioned between the L2 network switch and the L3 network device to which to forward the frame.

12. The method of claim 1, wherein the MPLS label indicates, to a provider edge device of the MPLS network positioned between the L2 network switch and the L3 network device, a path through the MPLS network to the L3 network device on which to forward the MPLS packet.

13. The method of claim 1, wherein selecting the MPLS label comprises selecting the MPLS label based on the access line on which the L2 frame was received.

14. A layer two (L2) network device comprising:
an L2 control protocol that allows a layer three (L3) device to control provision of L2 functionality by the L2 network device, wherein the L2 control protocol receives configuration information dynamically configured by the L3 device that specifies individual allocation by the L3 network device of subscriber labels to access lines, and wherein the subscriber labels uniquely identify the subscriber devices associated with the access lines wherein the access lines provide access by the subscriber devices to the L2 network device;
an interface card that receives an L2 frame from a subscriber device coupled via an access line to the L2 network device;
a control unit that selects a subscriber label for the subscriber device based on the individual allocation specified by the configuration information, wherein the selected subscriber label uniquely identifies the subscriber device associated with the access line,
wherein the control unit selects a Multi-Protocol Label Switching (MPLS) label to apply to the L2 frame from a set of MPLS labels, wherein the selected MPLS label is associated with the L3 network device,
wherein the control unit applies the selected subscriber label and the selected MPLS label in a data plane of the L2 network device to the received L2 frame to form an MPLS packet, wherein the subscriber label is applied as an inner label and the MPLS label is applied as an outer label of the MPLS packet, and
wherein the control unit outputs the MPLS packet from the L2 network device to an MPLS network.

15. The L2 network device of claim 14, wherein the L2 control protocol is the Layer Two Control Protocol (L2CP).

16. The L2 network device of claim 14, wherein the received L2 frame comprises a request from one of the subscriber devices for network services.

17. The L2 network device of claim 16, further comprising:
a service deliminator that determines a type of service associated with the received request, and wherein the control unit selects the MPLS label to apply to the L2 frame from the set of MPLS labels based on the determination.

18. The L2 network device of claim 14, wherein the L2 network device is an access node of a broadband service provider domain.

19. The L2 network device of claim 14, wherein the L2 network device is an access node of a wireless service provider domain.

20. The L2 network device of claim 14, wherein the L2 network device receives the MPLS labels without exchanging label information using an MPLS signaling protocol.

21. A system comprising:
a plurality of subscriber devices that request network services;
an access node network device that receives the requests for network services from the plurality of subscriber devices, and forwards the requests as Multi-Protocol Label Switching (MPLS) packets to a MPLS network; and
a broadband services router that receives the requests from the access node network device via the MPLS network, and, prior to the access node network device forwarding the requests as MPLS packets, configures the access node network device to include a set of subscriber labels via a layer two (L2) control protocol that allows the broadband services router to control provision of L2 functionality by the access node network device, wherein the set of subscriber labels are individually allocated by the broadband services router to access lines that extend between the subscriber devices and the access node network device, which extend between the access node network device and each of the plurality of subscriber devices and provide the subscriber devices with access to the access node network device, wherein the subscriber labels uniquely identify the subscriber devices associated with the access lines, wherein the access node network device receives one of the requests as an L2 frame from one of the plurality of subscriber devices via an access line and selects a subscriber label for the subscriber device based on the individual allocation, wherein the selected subscriber label uniquely identifies the subscriber device associated with the access line, wherein the access node network device selects an MPLS label to apply to the L2 frame from a set of MPLS labels, wherein the selected MPLS label is associated with the broadband services router, and wherein the access node applies the selected subscriber label and the selected MPLS label in the data plane to the received L2 frame according to the allocation to form an MPLS packet, wherein the subscriber label is applied as an inner label and the MPLS label is applied as an outer label of the MPLS packet.

22. A non-transitory computer-readable medium encoded with instructions for causing a programmable processor to perform steps comprising:
receiving configuration information on a layer two (L2) network device via an L2 control protocol that allows a layer three (L3) network device to control provision of L2 functionality by the L2 network device, wherein the configuration information specifies a set of subscriber labels to be individually allocated by the L2 network device to access lines that extend between subscriber devices and the L2 network device and provide the subscriber devices with access to the L2 network device, wherein the configuration information specifies individual allocation by the L3 network device of subscriber labels to access lines, and wherein the subscriber labels uniquely identify the subscriber devices associated with the access lines;
receiving an L2 frame from a subscriber device coupled via an access line to the L2 network device;
selecting a subscriber label for the subscriber device based on the individual allocation specified by the configuration information, wherein the selected subscriber label uniquely identifies the subscriber device associated with the access line;
selecting a Multi-Protocol Label Switching (MPLS) label to apply to the L2 frame from a set of MPLS labels, wherein the selected MPLS label is associated with the L3 network device;

applying the selected subscriber label and the selected MPLS label in a data plane of the L2 network device to the received L2 frame to form an MPLS packet, wherein the subscriber label is applied as an inner label and the MPLS label is applied as an outer label of the MPLS packet; and outputting the MPLS packet from the L2 network device to an MPLS network.

23. The computer-readable medium of claim 22, wherein the instructions cause the processor to receive and apply the MPLS labels without exchanging label information using an MPLS signaling protocol.

* * * * *